Patented Aug. 4, 1931

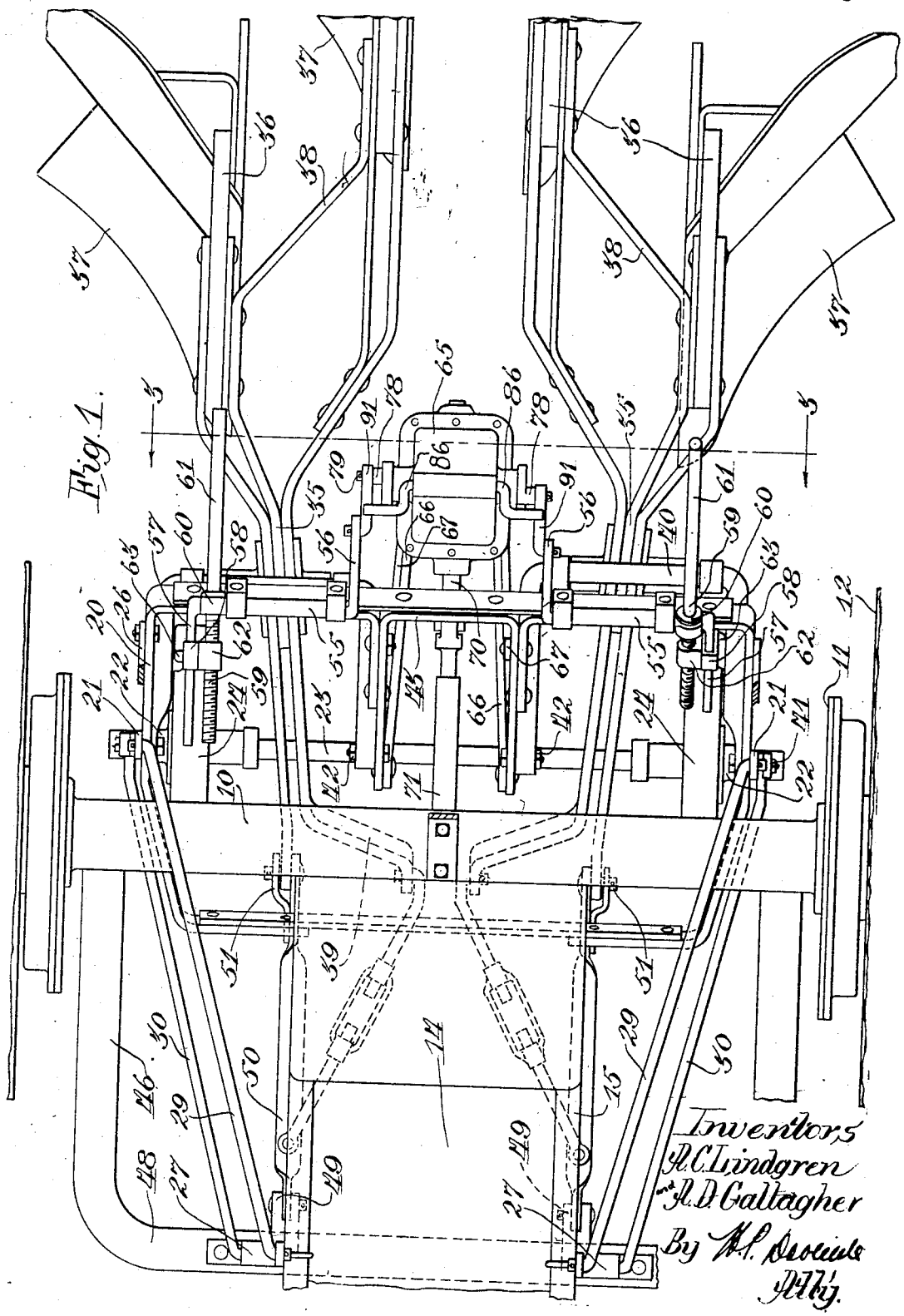

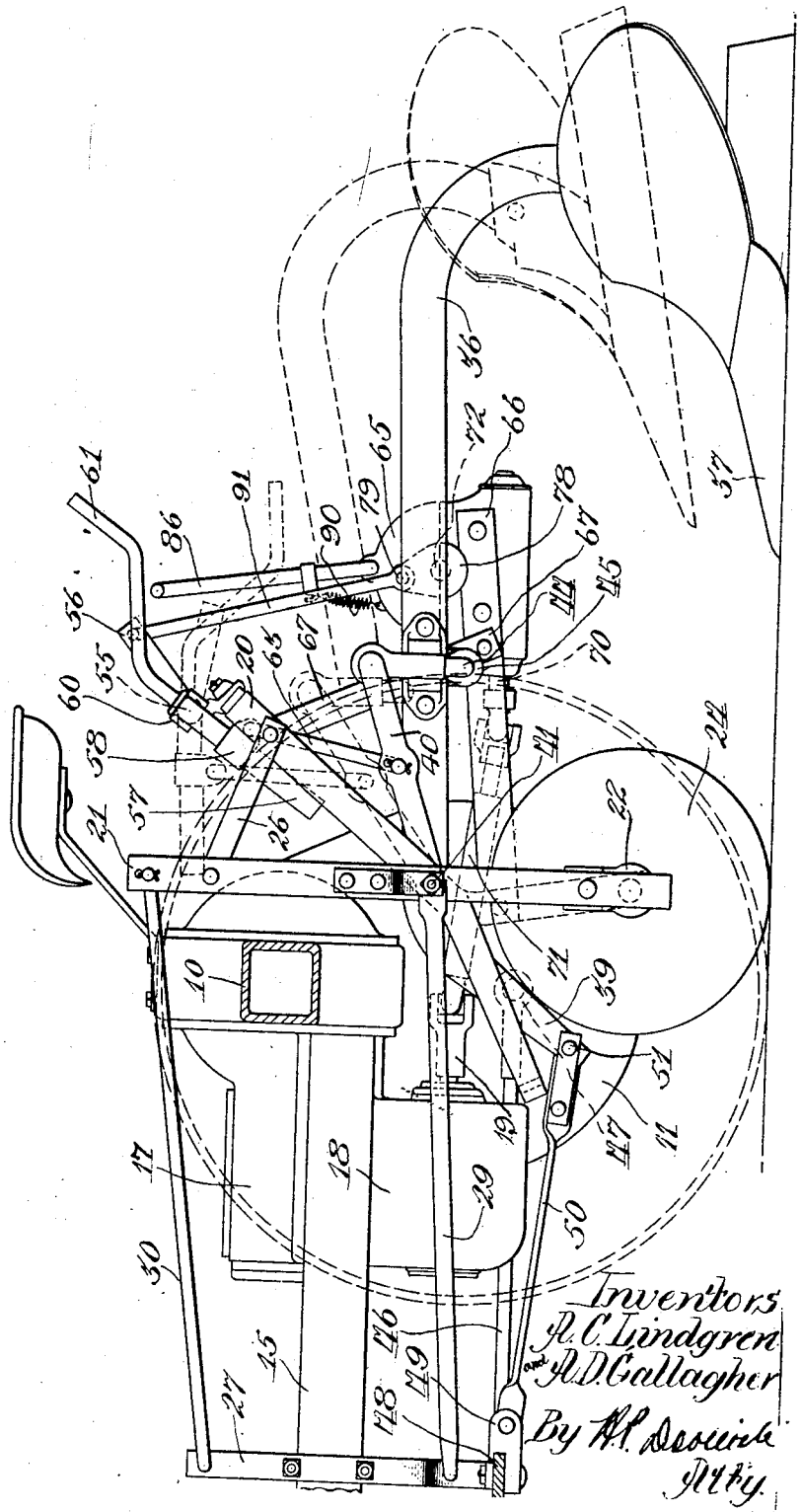

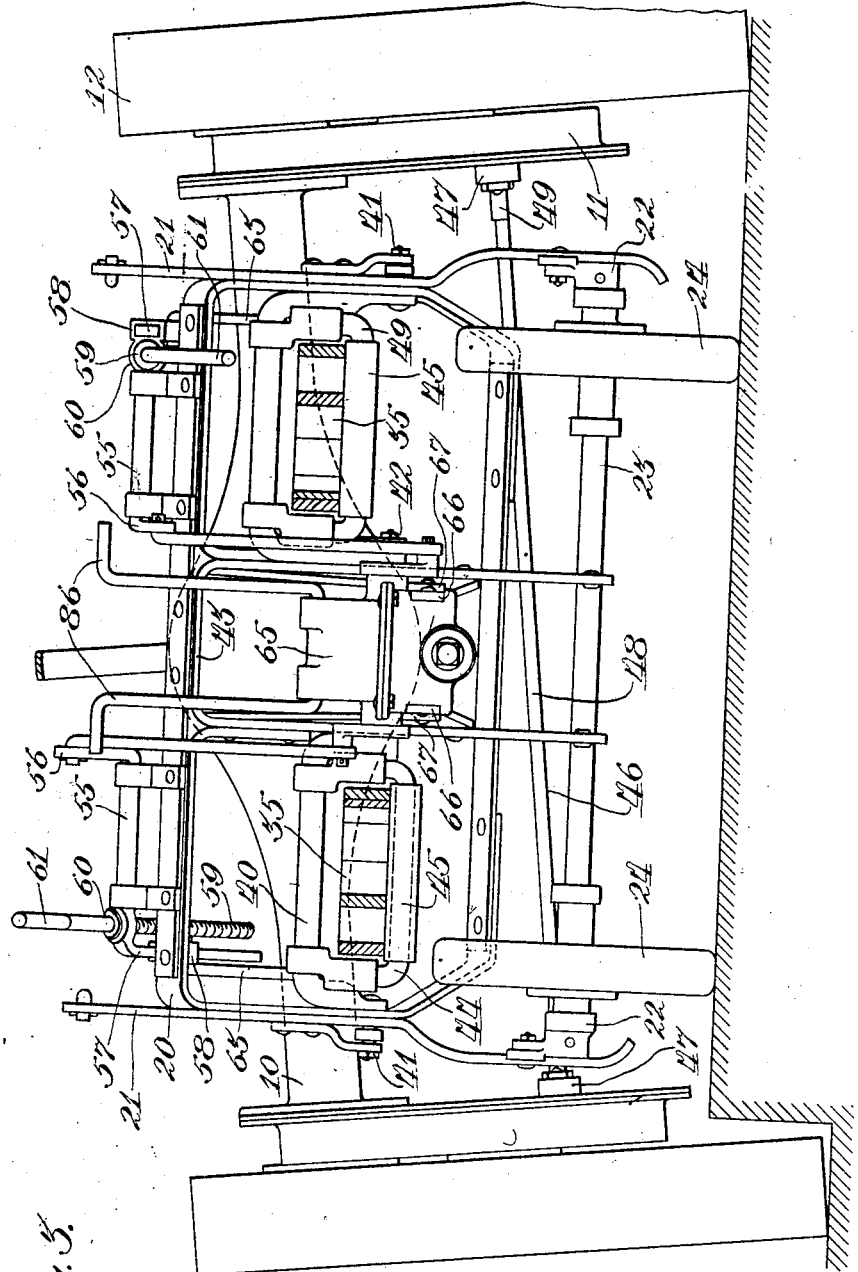

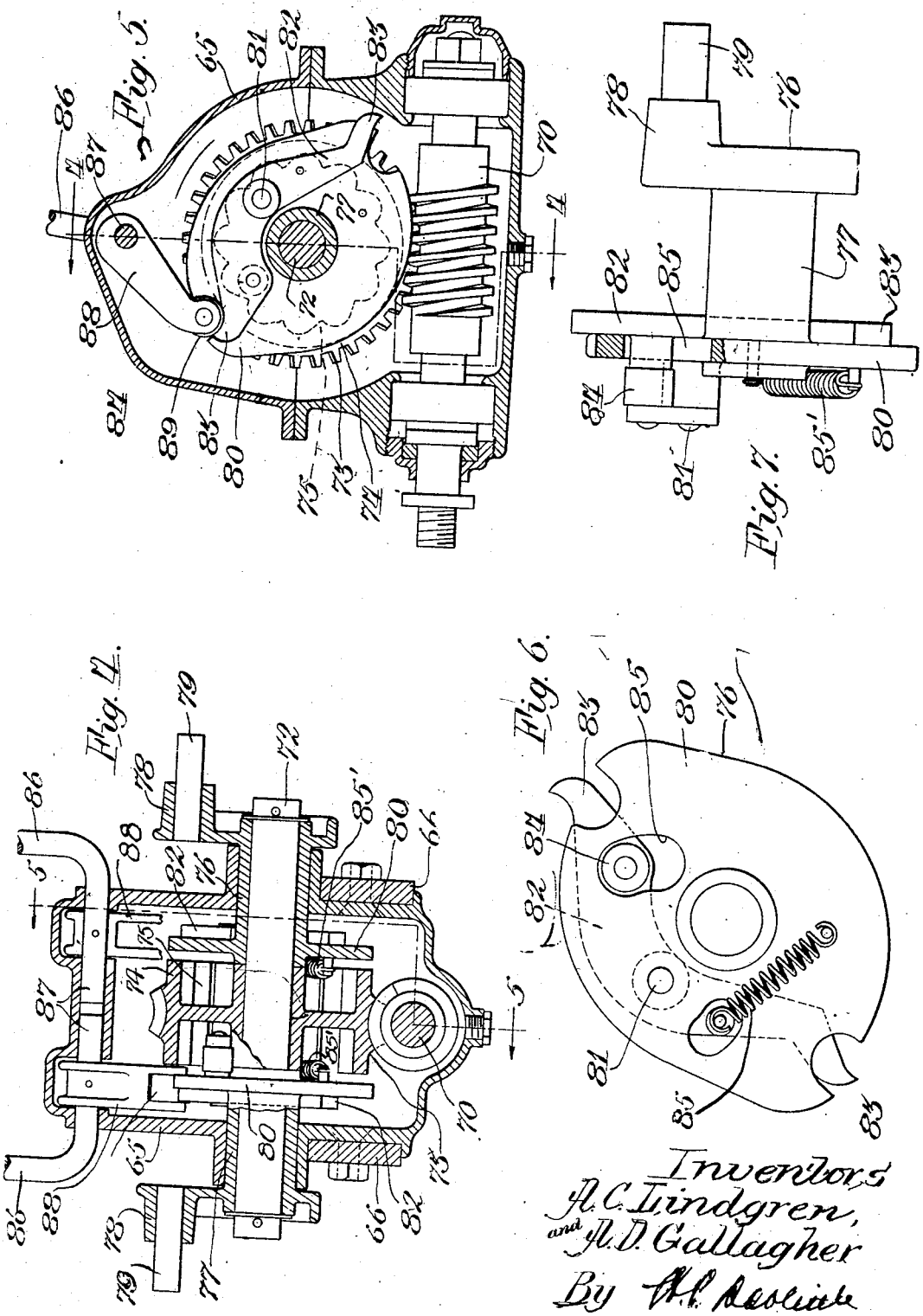

1,817,085

UNITED STATES PATENT OFFICE

ALEXUS C. LINDGREN, OF CHICAGO, AND ARTHUR D. GALLAGHER, OF CANTON, ILLINOIS, ASSIGNORS TO INTERNATIONAL HARVESTER COMPANY, A CORPORATION OF NEW JERSEY

TRACTOR PLOW

Application filed May 29, 1929. Serial No. 366,814.

The present invention relates to plows constructed for operation in combination with tractors of existing types.

The main objects of the invention are to provide a plow attachment for tractors which, when connected, will turn with the tractor as a unit; will serve to position the plows close to the rear axle structure of the tractor; and, will provide for free floating movement of the attachment vertically with respect to the tractor during operation.

It is also an object of the invention to provide a form of flexible draft connection or linkage between the attachment and the tractor that will hold the attachment rigidly in position with respect to the tractor as regards horizontal angular movements, while permitting the attachment and the plows carried thereby to independently follow undulations in ground surfaces.

In its more specific aspects, the purpose of the invention is to provide a two-way plow attachment having the characteristics above outlined and which will be particularly adapted for a standard type of wide tread or row crop tractor and designed to be mounted between the widely spaced rear wheels of that tractor with the frame of the attachment occupying most of the space between the wheels and practically all located within the transverse planes enclosing the wheels.

Other objects and advantages inherent in a structure embodying the invention will become apparent to those familiar with the art from the following more detailed description. The invention accordingly resides in the organization and details of construction hereinafter more particularly set forth and claimed and illustrated in the accompanying drawings, where,—

Figure 1 is a plan view showing the plow of the invention in position on the rear end of a tractor;

Figure 2 is a side elevation of the structure shown in Figure 1 with the tractor wheel omitted;

Figure 3 is a rear elevation of the structure shown in Figure 1 with the plow beams sectioned on the line 3—3 of Figure 1;

Figure 4 is a transverse vertical section through the clutch mechanism for operating the lifting and lowering means for the plows on the line 4—4 of Figure 5;

Figure 5 is a longitudinal section through said mechanism on the line 5—5 of Figure 4;

Figure 6 is a detail view of the intermittently rotated member in the clutch mechanism embodied in the structure of Figures 4 and 5; and, Figure 7 is a view of the same part as shown in Figure 6 viewed at right angles.

In the particular embodiment of the invention herein disclosed the plow attachment is illustrated as connected to a tractor having a transversely extended rear axle structure comprising a horizontal axle housing 10 having depending vertical housings 11 fixed to each end thereof.

Traction wheels 12 are mounted on the outer sides of the depending housings 11 and are driven through differential shafts and gearing contained within the housings 10 and 11. The above construction provides an upwardly arched axle structure having widely spaced rear wheels supporting the same. The tractor also comprises a comparatively narrow, forwardly extending, central body portion 14 which supports the power plant (not shown) and which preferably comprises side bars or sills 15. Just forwardly of the axle structure of the tractor and between the sills 15 there is a transmission housing 17 which is extended below the level of the sills as a second housing 18, in which there is enclosed gearing for driving, from the transmission, a rearwardly directed power take-off shaft 19. The location of the power take-off shaft is accordingly central and below the level of the transverse portion of the axle structure.

The plow attachment designed for connection to and cooperation with a tractor having the rear end structure above set forth comprises a substantially upright frame structure composed of an oblong, rectangular frame 20 with its inner diameter extending parallel to the axle structure of the tractor and occupying substantially all of the space between the depending housings 11. The frame 20 is of open construction and preferably composed of rigidly connected sections as illustrated and is supported in a rearwardly inclined position with its forward portion extending under the axle and its rear or upper portion close behind and somewhat above it.

The frame structure also includes vertical side members 21 which are centrally secured to the ends of the rectangular frame 20. The side members 21 extend upwardly above the transverse portion of the axle structure and downwardly below frame 20 and at their lower ends carry bearing boxes 22 (Figure 3) for a transverse axle 23 on which there is journaled a pair of ground wheels 24. Links or braces 26 connect the upper ends of the upright members 21 with the upper portions of the end sections of frame 20. At points on the tractor body forwardly of the axle structure the sill members 15 have secured thereto vertical bars 27, which bars are centrally clamped to the sills and extend above and below the sill members. Each of these bars is connected to each of the vertical members 21 of the attachment frame by means of a pair of vertically spaced, parallel links 29, 30. Each pair of links is arranged with one link passing above and the other below the axle structure (Figure 2), and the respective links of each pair are pivoted to one upright bar 27 and to an upright member 21 of the frame 20. This arrangement provides flexible draft connections for the attachment frame, which is thus held upright and rigid as against horizontal, angular movement, while being permitted free floating movement in a vertical direction on rectilinear lines. The fact that the coupling links 29 and 30 at either side diverge rearwardly from their points of connection to the upright bars 27 to their connections to the members 21 adds to the resistance to horizontal angular movement of the attachment frame.

The attachment frame structure above described is particularly adapted for supporting oppositely faced moldboard plows, which in this instance are illustrated as comprising two units each having two plow beams. The plowing units are carried on opposite lateral sides of the frame and are adapted to be alternately lifted and lowered in the manner commonly practiced with two-way or hillside plows. Each plow unit comprises a beam structure 35, which may be composed of multiple bars, as illustrated in Figure 1, diverging at the rear to afford properly spaced supports for the plow beams or standards 36 carrying the plow bodies 37. The members constituting the beam structure preferably include a rearwardly extending brace member 38 and at their forward ends one of the members forming the forward portion of the beam structure is laterally bent at 39 (Figure 1) to provide a forked forward end on the beam structure. Each plowing unit and beam structure 35 is intermediately supported on the frame in a manner permitting it to be raised and lowered with respect thereto. The preferred structure for so supporting the plowing units comprises rearwardly extending bail members 40, each of which has an outer arm pivoted at 41 to the end piece of frame 20 at the point where end members 21 are secured to frame 20, and an inner arm pivoted at 42 to one of the arms of a forwardly and downwardly extending U-shaped section 43 forming the central section of frame 20. This U-shaped section is rigidly secured centrally of frame 20, as shown in Figure 1 with its arms extending downwardly and supported on axle 23.

As best seen in Figure 3, the bight or transverse portions of each bail member 40 have pivotally suspended thereon second bail-shaped members 44 on which are mounted sleeves 45 to which the beam structures 35 are intermediately clamped. As the attachment frame is located close behind the axle structure, the forward ends of the beam structures 35 are positioned under and a little forward of the axle structure, as seen in Figure 2, the forward forked ends of the beams being bent downwardly to afford a low point of draft connection. The draft connections for the beams comprise a forwardly extending U-shaped drawbar 46 which is connected to the depending portions 11 of the axle structure by trunnions 47 seen in Figure 3 and has its transverse portion 48 located well in advance of the axle structure and preferably secured to and supported by the lower ends of the vertical bars 27. The transverse portion 48 of the drawbar carries clevises 49 to each of which there is pivotally connected a draft link 50, which is in turn pivotally connected at 51 to the forward end of one fork or member of the plow beam structure. In order to provide for some angular adjustment of the plow beam structure for lining up purposes, each draft link 50 is connected by an adjustable link, shown in dotted lines on Figure 1, at 51 with the offset member 39 at the front end of the beam structure. The link 51 is preferably composed of two members having a turnbuckle connection as illustrated. The construction specified affords a vertically flexible draft connection between each beam and a forward point below the body of the tractor giving the advantage of a low point of draft connection.

The mechanism for lifting and lowering the plow units is preferably, though not necessarily, operated from the power take-off shaft of the tractor, and one preferred embodiment of such mechanism will now be described. In the present instance each bail 40 is connected to crank mechanism mounted on the upper transverse member of the frame 20. The crank mechanism comprises a rock-shaft 55 journaled in suitable bearings on the frame 20 and having oppositely directed crank arms 56 and 57. The crank arm 57 is forwardly directed and is formed to carry a slide block 58 which is adjustable longitudinally on the arm 57. The adjusting mechanism for the slide 58 consists of a screw shaft 59 journaled in a bearing 60 on the shaft 55 and having a crank handle 61 at its upper end. A screw threaded opening in a lug 62 on the slide block 58 receives the screw threaded end of the screw shaft 59. Turning movements of the shaft 59 will, therefore, move the block 58 on the arm 57. The block 58 is pivotally connected by a link 63 with the bail 40, and, as the link will be moved with the block 58 during adjustment thereof, a fixed adjustment of bail 40 and the plowing unit carried thereby may be readily effected to vary the depth of plowing. For raising and lowering each bail 40 and plowing unit by rocking movements of the shaft 55 there is provided a motor operated power transmitting unit deriving its drive from the power take-off shaft 19. This unit consists of a casing 65, which is supported on rearwardly extending, spaced bars 66 which are clamped or bolted to the sides of the casing at their rear ends and are secured to the arms of the central U-shaped frame member 43 at their front ends.

Tie bars 67 connect the bars 66 with the upper portion of the frame member 43 forming a rigid supporting structure for the housing 65. It will be seen that the housing 65 is thus located centrally on the frame 20 and substantially in alignment with the power take-off shaft 19. The casing 65 is a closed structure for the retention of lubricant and is formed with bearings for a longitudinally extending worm shaft 70 (Figure 5), the forward end of which projects from the casing and is connected to the power take-off shaft 19 through an extensible and flexible drive shaft 71 formed of telescopically related sections connected to the power take-off shaft and to the wormshaft by universal joints, as illustrated. The casing 65 is also provided with bearings for a transverse shaft 72, which extends slightly beyond the casing at either side. Within the casing and centrally of this shaft there is mounted a worm wheel or drum 73 which is in constant mesh with the worm shaft 70. The worm wheel 73 is formed with a wide rim providing laterally extending flanges 74 which are internally notched as at 75. Each end of the shaft 72 has journaled thereon a loose or driven clutch member 76. Each member comprises a sleeve portion 77 journaled on the shaft 72, which terminates at its outer end in a crank portion 78 located outside of the casing 72 and carrying a crank pin 79. Internally of the casing each driven clutch member has an oppositely notched disk portion 80 fixed on sleeve 77 and positioned adjacent one side and over an open face of the worm wheel 73. The disk portion 80 on the side away from the worm wheel has pivoted to it at 81 a trip member 82 formed with opposite arms terminating at the notches in the disk 80 as trip dogs 83.

The trip member 82 carries a clutch roller 84 which extends through a slot 85 in the disk member 80 and into the hollow space within one side of the worm wheel 73 and adjacent the notched inner surface of the flange 74. A coil spring 85' normally urges the roller 84 into engagement with the notched surface 75. It will be understood that the clutch elements are duplicated on each end of the shaft 72, but are independent as to actuation. The control means for the trip dogs 83 consists of a trip lever 86 for each clutch mechanism. These levers extend upwardly from the upper portion of the casing in convenient position to be reached from the operator's station on the tractor. Each lever has an inwardly bent portion 87 (Figure 4) journaled in the upper part of the casing 65 and having fixed thereon a trip arm 88 carrying a roller 89 which engages the peripheral edge of the disk member 80 of the clutch, and is adapted to seat in the opposite notches thereof. A spring 90 (Figure 2) connects the lever and casing and acts to swing the lever in a direction to urge the trip roller into the notches of the disk 80, thereby normally swinging the trip member 82 against the tension of spring 85 and locking the clutch in released or disconnected position. The crank pins 79 of each intermittently operable clutch element are connected by link rods 91 to the crank arms 56 of the rockshafts 55. The crank elements 78 of the clutches are so related to the actuating mechanism as to be in substantially dead center relation with the links 91 when disconnected from the drive after each half revolution.

With the clutch mechanism described, it will be understood that a rocking movement imparted to either lever 86 will raise trip roller 89 from its seat in the clutch member 80, thereby releasing the trip member 82 and permitting roller 84 to engage in one of the notches 75 of the worm wheel. As the rotation of this wheel is in the direction of the arrow on Figure 5, the clutch member 76 will be carried around with the worm wheel until the trip roller 89, which rides on the peripheral edge of the disk member 80, is brought to the opposite notch and drops into it, thus throwing out the trip member 82 and locking the clutch in disengaged position. As the respective clutch mechanisms on opposite sides of the casing may be independently actuated from the constantly driven worm wheel 73, there is provided readily operable lifting and lowering means for alternately lifting and lowering the opposite plowing units, as necessary when plowing in opposite directions across a field. At the same time it is obvious that both plowing units may be lifted or lowered simultaneously by actuating both trip levers 86.

The structure above described accordingly exemplifies a tractor plow organization in which there is afforded a close coupled plow carrying frame flexibly connected to the tractor and supported on carrying wheels which bear the entire weight of the attachment, thereby permitting the plow carrying frame to float or move vertically with respect to the tractor so that the plows follow the contour of the ground without being affected by up and down movements of the tractor. The construction also presents a novel manner of mounting and adjusting plowing units on the frame and of connecting same to the tractor by draft elements located below the level of the tractor body and forwardly of its axle structure.

The construction above described embodies the preferred form of the invention, but is obviously capable of modification without departure from the spirit or scope of the invention as defined in the following claims.

What is claimed is:

1. The combination with a tractor having rear wheels, an axle structure connecting the wheels and a body portion extending forwardly from the axle structure, of a plow carrying frame having ground wheels located within the transverse vertical planes of the rear tractor wheels, flexible draft connections between the frame and the body portion of the tractor, a plow having a beam supported between its ends on the frame, and a flexible draft connection between the plow beam and the tractor.

2. The combination with a tractor having rear wheels, an axle structure connecting the wheels and a body portion extending forwardly from the axle structure, of a transversely extending frame located between the rear wheels of the tractor, ground wheels on the frame, pivoted draft links connecting the frame to the body portion of the tractor, a plow having a beam supported between its ends on the frame, a draft member on the tractor forwardly of the axle structure, and a pivoted link connecting the plow beam to the draft member.

3. The combination with a tractor having rear wheels, an axle structure connecting the wheels and a body portion extending forwardly from the axle structure, of a transversely extending frame located between the rear wheels of the tractor and comprising upright side members, ground wheels at the lower ends of the side members, vertically spaced parallel draft links pivotally connecting each side member of the frame with the body portion of the tractor, a plow having a beam supported between its ends on the frame, a draft member on the tractor forwardly of the axle structure, and a pivoted link connecting the plow beam to the draft member.

4. The combination with a tractor having widely spaced rear wheels, an axle structure connecting the wheels and a central body portion extending forwardly from the axle structure, of a frame located in close relation to the rear of the axle structure and occupying the space between the wheels, ground wheels on the frame, pivoted links connecting each end of the frame to forward points on each side of the body portion of the tractor, plows having beams intermediately supported on the frame near the respective outer sides thereof, a transversely extending draft bar carried by the tractor forwardly of the axle structure, and a pivoted draft link connecting each plow beam with the draft bar.

5. The combination with a tractor having widely spaced rear wheels, an axle structure connecting the wheels and a central body portion extending forwardly from the axle structure, of a frame located in close relation to the rear of the axle structure and occupying the space between the wheels, ground wheels on the frame, upright bars secured to each side of the body portion of the tractor forwardly of the axle structure, a vertically spaced pair of links connecting each end of the frame with the respective upright bars, a forwardly extending U-shaped drawbar connected to the axle structure and having its transverse portion supported under the tractor body, opposite plows having beams intermediately supported on the frame near the respective outer sides thereof, and a pivoted draft link connecting each plow beam with the transverse portion of the drawbar.

6. The combination with a tractor having widely spaced rear wheels, an axle structure connecting the wheels and a central body portion extending forwardly from the axle structure, of a frame located in close relation to the rear of the axle structure and occupying the space between the wheels and including upright side members extending above the axle structure, ground wheels on the frame, vertically spaced parallel links extending forwardly from each upright member at points above and below the axle structure and pivoted at forward points on the body portion of the tractor, opposite plows having beams intermediately supported on the frame near the respective outer sides thereof with the forward ends of the beams extending under the axle structure, and draft links connecting each beam to forward points on the tractor.

7. The combination with a tractor having widely spaced rear wheels, an axle structure connecting the wheels and a central body portion extending forwardly from the axle structure, of a frame occupying the space between the wheels and including upright side members located close to the rear side of the axle structure and adjacent the inner side of each rear wheel of the tractor, ground wheels carried by the lower ends of said upright members for supporting the frame, upright bars secured to each side of the body portion of the tractor forwardly of the axle structure, a vertically spaced pair of parallel links connecting each upright end member of the frame to the upright bars on the tractor body, a forwardly extending U-shaped drawbar connected to the axle structure and having its transverse portion secured to the lower ends of the upright bars on the tractor body, plows located at each side of the central longitudinal line of the tractor and having beams intermediately pivoted on the frame, and a draft link connecting each plow beam with the transverse portion of the drawbar.

8. A tractor plow comprising a substantially upright frame, a pair of ground wheels on the frame constituting the sole support therefor, a rearwardly extending bail having its arms pivoted to the frame, a plow having a beam intermediately fulcrumed on the bail, adjusting mechanism carried by the frame and connected to the bail, and means on the frame adapted to connect the frame to a tractor in floating relation thereto.

9. A tractor plow comprising a frame, a pair of ground wheels on the frame constituting the sole support thereof, a rearwardly extending bail having its arms pivoted to the frame, a second bail pivotally suspended from the cross member of the first bail, a plow having a beam intermediately mounted on the second bail, adjusting mechanism carried by the frame and connected to the first bail, and means on the frame adapted to connect the frame to a tractor in floating relation thereto.

10. A tractor plow comprising a substantially upright laterally extended frame, a pair of ground wheels on the frame constituting the sole support thereof, a rearwardly extending bail on each lateral portion of the frame each bail having its arms pivoted to the frame, a plow beam intermediately fulcrumed on each bail said beams carrying opposite plows, means on the frame for selectively lifting and lowering either bail and plow, and means on the frame adapted to connect the frame to a tractor in floating relation thereto.

11. The combination with a tractor comprising rear wheels, an axle structure connecting said wheels and a power take-off shaft extending at right angles to the axle structure, of a wheel supported frame, means for connecting the frame to the tractor in floating relation thereto, a plow having a beam connected to the tractor, vertically adjustable supporting means connecting the beam to the frame, crank actuated mechanism on the frame for lifting and lowering the supporting means, a flexible drive shaft connecting the power take-off shaft with the crank mechanism, and means for controlling actuation of the crank mechanism by said drive shaft.

12. The combination with a tractor comprising rear wheels, an axle structure connecting the wheels and a centrally positioned power take-off shaft extending at right angles to the axle and located below the same, of a two-way plow comprising a wheel supported frame positioned in close relation to the rear side of the axle structure, draft links connecting the frame to the tractor in vertically floating relation, opposite plows having beams intermediately fulcrumed on the frame at each side of the central longitudinal line of the tractor and connected to the tractor, trip actuated intermittent clutch mechanism carried by the frame between the plows, lifting and lowering mechanism connecting said mechanism with each plow beam, and a flexible drive shaft connecting the power take-off shaft with the clutch mechanism.

13. The combination with a tractor comprising rear wheels, an axle structure connecting the wheels and a centrally positioned power take-off shaft extend at right angles to the axle and located below the same, of a two-way plow comprising a wheel supported frame positioned in close relation to the rear side of the axle structure, draft links connecting the frame to the tractor in vertically floating relation, opposite plows having beams intermediately fulcrumed on the frame at each side of the central longitudinal line of the tractor and connected to the tractor, a pair of intermittent clutch mechanisms carried by the frame between the plows, a common driving element engageable with either clutch mechanism, trip members for controlling the actuation of each clutch, lifting and lowering connections connecting the respective plows and clutches, and a flexible shaft connecting the power take-off shaft with the common driving element for the clutches.

14. The combination with a tractor comprising rear wheels, an axle structure connecting said wheels and a power take-off shaft extending at right angles to the axle structure, of a support connected to the tractor and located immediately behind the axle structure, separately vertically movable plow supporting means on the support, opposite plows having beams intermediately fulcrumed on the plow supporting means and positioned at each side of the central longitudinal line of the tractor with the forward portions of the beams extending under the axle structure, a draft link connecting each plow beam to a point on the tractor forward of the axle structure, clutch controlled mechanism on the support for moving the plow supporting means, and a driving connection between the power take-off shaft and the clutch controlled mechanism.

15. The combination with a tractor comprising rear wheels, an upwardly arched axle structure connecting said wheels and a power take-off device located below the transverse portion of the axle structure, of a support connected to the tractor and located immediately behind the axle structure, separately vertically movable plow supporting means on the support, opposite plows having beams intermediately connected to the plow supporting means and positioned at each side of the central longitudinal line of the tractor with the forward portions of the beams extending under the transverse portion of the axle structure, a draft connection between the forward end of each beam and the tractor, mechanism on the support for moving the plow supporting means, and an actuating connection between the power take-off device and said mechanism.

In testimony whereof we affix our signatures, in the presence of two witnesses.

ALEXUS C. LINDGREN.
ARTHUR D. GALLAGHER.